L. BADOIS.
PRESSURE INDICATING MEANS.
APPLICATION FILED MAY 12, 1914.
1,165,833.
Patented Dec. 28, 1915.
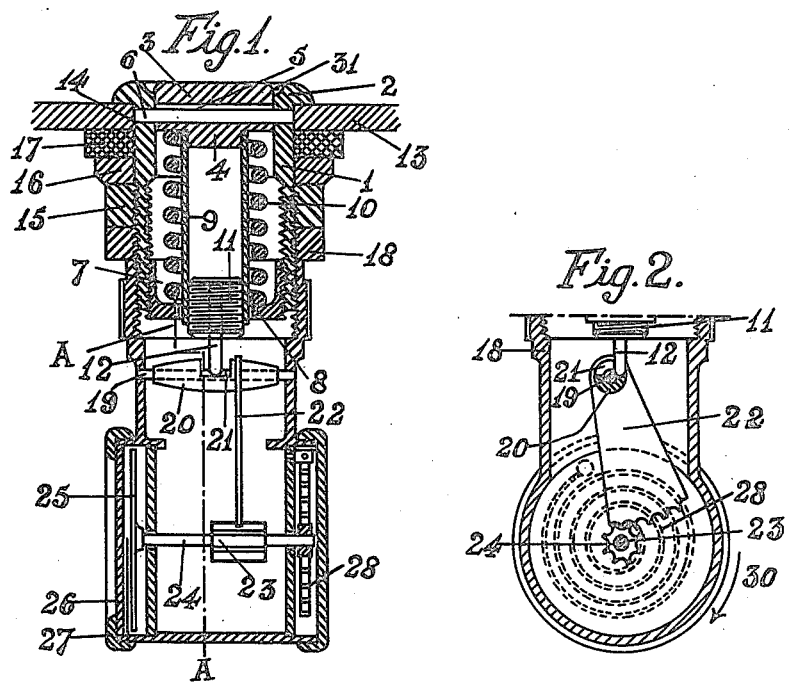
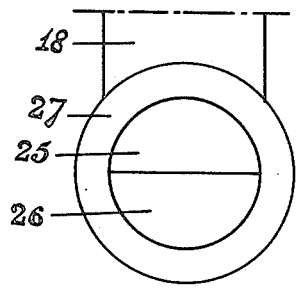
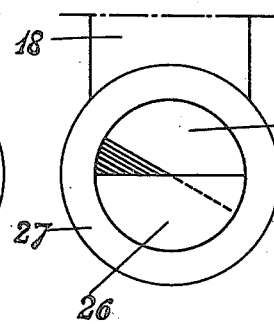
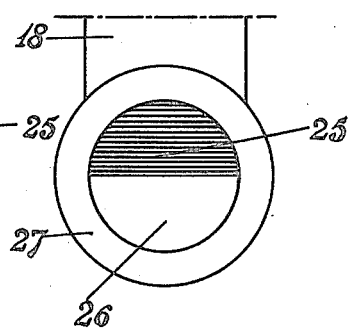
Witnesses
E. G. Marshall
Inventor
Louis Badois
By John H. Hall
his Attorney

UNITED STATES PATENT OFFICE.

LOUIS BADOIS, OF PARIS, FRANCE.

PRESSURE-INDICATING MEANS.

1,165,833.

Specification of Letters Patent.

Patented Dec. 28, 1915.

Application filed May 12, 1914. Serial No. 838,013.

*To all whom it may concern:*

Be it known that I, LOUIS BADOIS, a citizen of the Republic of France, residing at Paris, France, have invented new and useful Improvements in or in Connection with Pressure-Indicating Means, of which the following is a specification.

This invention has reference to means for indicating the pressure obtaining within a receptacle, and has relation, in particular but not exclusively, to means for indicating the pressure obtaining within the air tube of a pneumatic tire of a motor propelled or other road vehicle.

The invention further has relation to pressure indicating means of the kind in which a container or casing is mounted on a carrier, for example, the rim of a wheel, and contains an endwise movable piston that is subjected to two opposing forces, the one being due to the pressure to be indicated and the other to a spring, the movements of the piston due to alterations in the one of the forces actuating, through motion multiplying mechanism, an indicator.

The invention also has relation to pressure indicating means of the kind in which movement of the indicator is effected by movement of a piston, such movement being very small and transmitted to the indicator through multiplying mechanism.

The invention has for object to provide an improved construction of pressure indicating means of the kind referred to whereby great sensitiveness is obtained owing to the large multiplication and to the fact that the moving elements of the means act practically without friction and without play.

The invention also enables clear and easily read indications to be obtained, owing to the construction of the indicating means and to its arrangement in relation to the observer, so that when applied to the wheel of a vehicle, the indicating means is arranged in a plane parallel to that of the wheel and is therefore constantly visible. Finally, when applied in the manner specified above, the means enable the wheel to be balanced by placing it on the opposite side to that at which the inflation valve is located. For these purposes and in accordance with this invention the movement of the indicator is effected from an endwise movable piston through a toothed sector of large radius and a pinion of small diameter, subject for the purpose set forth, to the controlling action of a spring, the point of contact of the piston with the sector being so disposed that the displacement of this point along the surface of contact on movement of the sector is practically *nil*.

Further the invention consists in the construction and arrangement of parts all as hereinafter described with reference to and as shown on the accompanying sheet of drawings.

In order that the invention and the nature and character of the improvements may be clearly and readily understood, reference will now be made to the accompanying sheet of drawings on which pressure indicating means of the kind herein referred to embodying the improvements in accordance with this invention and intended for use in connection with a pneumatic tire of a motor propelled or other road vehicle, are illustrated.

Figure 1 is a vertical section through the complete apparatus; and Fig. 2 is a section on the line $2^x$—$2^x$ of Fig. 1 of the lower part of the pressure indicating means, the plane of the section being at right angles to that of Fig. 1. Figs. 3, 4 and 5 are diagrammatic views and represent an indicator in three positions, each position indicating and corresponding to a different pressure.

1 is a tubular member having at one end a circular and outwardly extending flange 2. At the other end and for a portion of its length, externally and internally, the member 1 is screw-threaded.

3, 4 is a piston. The piston comprises two portions, the portion 3 being of larger diameter than the portion 4. The portion 4 forms a boss and the diameter of the portion 3 is such that it can be placed within the member 1 and will be a close fit therein, but not so close as to interfere with or prevent its free movement.

5 is a hole drilled transversely of the portion 3 of the piston.

In assembling the parts 1, 3, 4, the piston is placed within the member 1 and is retained in position by a pin 6 which passes through the hole 5 and is mounted or secured at its ends in holes in the member 1. The diameters of the hole 5 and pin 6 are in such relation that the piston 3, 4 can move to a small extent longitudinally of the member 1. The piston 3, 4 is normally in such a position that the pin 6 is in contact with the lower side of the hole 5 and the face of the piston is in the same plane as the face of the flange 2.

7 is a sleeve that is of a size to fit within the member 1 and is screw-threaded externally to correspond with the screw-threads on the interior of the member 1.

8 is a circular and inwardly extending flange on the sleeve 7.

9 is a tubular member mounted on the boss or portion 4 of the piston 3, 4.

10 is a spring encircling the member 9 and bearing at its ends against the inner face of the portion 3 of the piston 3, 4 and the inner face of the flange 8. By screwing the sleeve 7 in or out the stress on the spring 10 can be varied.

The lower end of the member 9 is screw-threaded internally and into such screw-threaded portion is screwed a block 11 carrying a projecting pin 12.

13 is the rim of the wheel. The rim is provided with a hole 14 through which is passed the member 1 until the inner face of the flange 2 comes in contact with the outer face of the rim. The member 1 is held in position by means of a nut 15 screwed on to the external screw-threads of the member 1.

16, 17 are washers, the washer 17 being made of india rubber or other resilient material.

By mounting the means and the inflation valve at opposite ends of a diameter, the effects of centrifugal force are to some extent compensated.

18 is a casing adapted to contain the indicating mechanism. This casing is screwed on to the member 1 as shown. In the casing 18 the ends of a shaft 19 are mounted. This shaft 19 has mounted on it a sleeve 20 that is cut away at 21 and has secured to it a toothed sector 22 of large diameter. The parts 19 and 20 could be made in one in which event the ends of the part 20 would be turned down to form pivots. The pin 12, when the parts are assembled, engages the cut away portion 21, the point of contact being very close to the shaft 19.

It is important to mention that the pressure of the pin 12 on the cut-away portion 21 is effected without giving rise to any appreciable friction, since the position of contact is so chosen that the displacement of this point of contact along the cut away portion 21 is practically nil. The sector 22 meshes with a pinion 23 mounted or formed in one with a shaft 24 mounted at its ends in the casing 18. On the shaft 24 is also mounted an indicator 25, the plane of which is parallel to the plane of the wheel, so as to render the indication always visible, no matter in what position the wheel may be. The motion multiplying mechanism just described is such that the indicator moves through an angle of 180° when the piston 3, 4 is moved through a distance of 0.5 m/m.

The indicator 25, which is, preferably, divided across a diameter into two colors, say black and white, is disposed within the casing 18 behind a glazed opening 26, the glass being held by a ring 27 screwed on to the casing 18. The glass is, preferably, divided by a horizontal diametral line, the portion below such line being painted, say, white.

In order to prevent play between certain parts of the apparatus, which is necessary to establish a fixed zero in view of the small amount of movement possible, there is connected with the shaft 24 the one end of a hair spring 28, the other end of which is connected with the casing 18. The sector 22 is moved against the action of this spring, and, as a consequence, the parts have a tendency to move to their normal position and all parts are kept in contact. Under these conditions, when the semi-circular black portion of the indicator 25 is behind the semi-circular white portion of the glazing 26, the whole of the glazed opening is white as shown in Fig. 3. When this is the case, it is an indication that the pressure within the air tube of the pneumatic tire is at the correct pressure.

The apparatus will be adjusted in such a way that when the pressure in the air tube has been reduced by about 0.25 kg. the black portion of the indicator will begin to appear and will be completely exposed when the pressure has fallen by 0.5 to 1 kg.

In order that the action of the pressure transmitting and or retaining medium may be eliminated as much as possible, there is formed all around the inner edge of the flange 2 a groove 31 of about 1 to 2 m/m. This permits the medium to adapt and seat itself properly on the piston 3, 4.

By means of the screw threaded block 11, pin 12 may be so adjusted or moved longitudinally of the longitudinal axis of member 9 that the pin 12 may be caused to move by the piston 3 before engaging the cut away portion 21, by which means the indicator does not have to become operative until a certain amount of movement of piston 3 has taken place, leaving thereby a larger scale range for higher pressure. The simple knock-down construction here provided permits this adjustment to be made very readily.

The painted portion of the glazed opening 26 and the indicator 25 may be otherwise than as described. For example, the glazed opening instead of being circular may be of other shape and the indicator may be comprised of sectors of different colors which appear behind the glazed opening 26 as the pressure varies.

The indicator might be replaced by a simple needle, which would then move in front of a graduated scale. Finally, the indicating means described do not necessarily require to be mounted on the receptacle of which it enables the pressure to be gaged. It may, for example, in certain cases be arranged at any point specially chosen to facilitate the reading of the indications, and in this case the internal atmosphere of the receptacle with which it must be combined then communicates with the means by means of a suitable pipe terminating in a connection provided with a flexible part that acts on the piston 3, 4 in the same manner and under the same conditions as the india rubber of the air tube of a pneumatic tire in the example shown on the drawings. This arrangement is particularly suitable in cases in which the device forming the object of the invention is applied for the purpose of gaging the pressure in petrol tanks of motor cars.

It is obvious that the combination of the toothed sector and the before-mentioned pinion may be replaced by any other transmitting device giving an equivalent multiplication.

What I claim is:—

1. In a pressure indicator device, an indicator means, an adjustable pressure propelling means, an adjustable spring control for said adjustable propelling means and abutting means limiting the amount of travel of the propelling means.

2. In a pressure indicator device, a spring controlled indicator mechanism comprising a member moving said indicator against its spring control by constant contact with an impelling member, a pressure propelling means and an adjustable impelling member on said propelling means to control the contacting of said first mentioned impelling member with said member moving said indicator.

3. In a pressure indicator device, a pressure propelling means, an indicator means and means attached to said propelling means and said indicator means for giving movement to said indicator after an adjustable predetermined movement of said pressure propelling means.

4. In a pressure indicator device, a pressure propelling means, an indicator means and means attached to said propelling means and said indicator means for giving movement to said indicator after an adjustable predetermined movement of said pressure propelling means, and an abutting device for limiting the amount of travel of said propelling means.

5. A pressure indicator device comprising a tubular member having a piston therein provided with an abutment for a spring, an adjustable sleeve engaging said tubular member forming an abutment for a spring, a spring about said piston, an adjustable pin on said piston, and an indicating means controlled by the movement of said adjustable pin.

6. A pressure indicator device comprising a tubular member having a piston therein provided with an abutment for a spring, a pin for engaging said piston and tubular member to limit the movement of said piston, an adjustable sleeve engaging said tubular member forming an abutment for a spring, a spring about said piston, an adjustable pin on said piston, and an indicating means controlled by the movement of said adjustable pin.

Dated this 6th day of April 1914.

LOUIS BADOIS.

Witnesses:
ANDRÉ BORDILLON,
JULES FAYOLLET.